United States Patent
Pullara

(10) Patent No.: US 7,328,427 B2
(45) Date of Patent: Feb. 5, 2008

(54) SYSTEM AND METHOD FOR USING A PREPROCESSOR TO DETERMINE DEPENDENCIES BETWEEN J2EE COMPONENTS

(75) Inventor: Sam Pullara, San Francisco, CA (US)

(73) Assignee: BEA Systems, Inc., San Jose, CA (US)

(*) Notice: Subject to any disclaimer, the term of this patent is extended or adjusted under 35 U.S.C. 154(b) by 608 days.

(21) Appl. No.: 10/789,012

(22) Filed: Feb. 27, 2004

(65) Prior Publication Data
US 2005/0034101 A1    Feb. 10, 2005

Related U.S. Application Data

(60) Provisional application No. 60/450,431, filed on Feb. 27, 2003.

(51) Int. Cl.
*G06F 9/44*    (2006.01)
(52) U.S. Cl. .................... 717/121; 717/137; 709/220
(58) Field of Classification Search .................... None
See application file for complete search history.

(56) References Cited

U.S. PATENT DOCUMENTS
2003/0188036 A1* 10/2003 Chen et al. .................. 709/310

FOREIGN PATENT DOCUMENTS
CA    2323689 A1 * 12/2001

* cited by examiner

*Primary Examiner*—Wei Zhen
*Assistant Examiner*—Phillip H Nguyen
(74) *Attorney, Agent, or Firm*—Fliesler Meyer LLP

(57) ABSTRACT

A system and method for using a preprocessor to determine dependencies between J2EE components. The preprocessor can analyze a running J2EE application, and look at the deployment descriptor information associated with that application. The levels of indirection within the deployed application are followed to determine the actual configuration information used to deploy the application on a first application server. This configuration information can then be parsed, communicated, or otherwise output to a system administrator or software developer, or in some embodiments directly to a second application server, and used to deploy the application on that second application server.

8 Claims, 5 Drawing Sheets

Server Side

- Provide Management APIs Inside Server
- Define Data Sources (DS) with Respect to Connector Pools, JMS Queues, etc.
- Provide/Associate Data Source with a JNDI Name That It Will Be Bound To
- Associate Data Source With Connection Pool

Application Side

- Define Application (EJB) to Depend on One or More Data Sources (DS)
- Deploy EJB to a (J2EE) Server, e.g. Weblogic, Websphere, etc.
- Server Makes Connection From Data Source (DS) to JNDI Name (e.g. com.bea.ds.oracle)
- Connection is Kept in the Deployed EJB

FIGURE 4

SYSTEM AND METHOD FOR USING A PREPROCESSOR TO DETERMINE DEPENDENCIES BETWEEN J2EE COMPONENTS

CLAIM OF PRIORITY

This application claims priority to U.S. Provisional Patent Application 60/450,431, filed Feb. 27, 2003, entitled "SYSTEM AND METHOD FOR USING A PREPROCESSOR TO DETERMINE DEPENDENCIES BETWEEN J2EE COMPONENTS".

FIELD OF THE INVENTION

The invention relates generally to application servers and J2EE servers, and particularly to a system and method for using a preprocessor to determine dependencies between J2EE components.

BACKGROUND

The JAVA 2 Enterprise Edition (J2EE) platform is often used to build distributed transactional applications for the enterprise. To allow for rapid application design, the J2EE platform provides a component-based approach to the design, development, assembly and deployment of enterprise applications. The J2EE platform offers a multi-tiered distributed application model, and the ability to reuse components. In a multi-tiered distributed application model, application logic is divided into components according to their function and the components are often themselves physically divided onto separate machines depending on their association to a certain J2EE environment tier. Communication for the purpose of coordination between physically and logically distinct components of an enterprise application is therefore often complex.

A common problem with application servers is that, when moving applications from one server to another, either between servers of similar type/manufacture, or between servers of different type, the application configuration information must be duplicated in some manner on the destination server. This is usually a tedious and time-consuming process requiring the expert skills of an application developer or administrator. The process is also prone to error since it usually requires the developer to visually inspect large textual configuration files, and make necessary changes to configure the application for its new environment. Tools that can help the developer in this task would be very useful, would minimize the amount of time required to migrate the application from one server to another, and would promote the feasibility of moving applications from one server, or server product, to another.

SUMMARY

The invention provides a system and method for using a preprocessor to determine dependencies between J2EE components. The preprocessor can analyze a running J2EE application, and look at the deployment descriptor information associated with that application. The levels of indirection within the deployed application are followed to determine the actual configuration information used to deploy the application on a first application server. This configuration information can then be parsed, communicated, or otherwise output to a system administrator or software developer, or in some embodiments directly to a second application server, and used to deploy the application on that second application server.

BRIEF DESCRIPTION OF THE FIGURES

FIG. 4 shows an illustration of the server-side, and application-side features used by the preprocessor, in accordance with an embodiment of the invention.

DETAILED DESCRIPTION

As disclosed herein, an embodiment of the invention provides a system and method for using a preprocessor to determine dependencies between J2EE components. Generally described, an embodiment of the invention allows a system, such as an application server, or process running thereon, to analyze a running J2EE application, and to look at the deployment descriptor information associated with that application. In one embodiment the invention is provided in the form of a system that includes a preprocessor-type mechanism. The system/preprocessor follows the levels of indirection within the deployed application to determine the actual configuration information used to deploy the application on a first application server. This configuration information can then be parsed, communicated, or otherwise output to a system administrator or software developer, or in some embodiments directly to a second application server, and used to deploy the application on that second application server.

So, for example, if an application deployed on a first server specifies that it needs a particular data source in order to operate properly, at run time the preprocessor determines that the application needs that data source, and further determines what that data source might be. The preprocessor then check the global configuration information to locate a data source that matches the one specified by the application, and then retrieves both that particular data source configuration information and any configuration information which that data source may depend on. This configuration information is then used to assist in repackaging all of the applications' dependency-based deployment information for successfully deploying the application on another (second) server. In the context of this invention, the first and second server can be any application server, and particularly any J2EE-compatible server, including BEA's WebLogic system, IBM Websphere, or any equivalent application server product. The invention is designed to assist in the process of moving applications both between servers of the same type (i.e. between a first WebLogic server and a second WebLogic server), and between servers of different types (i.e. between a WebLogic server and a Websphere server).

Figure 1:
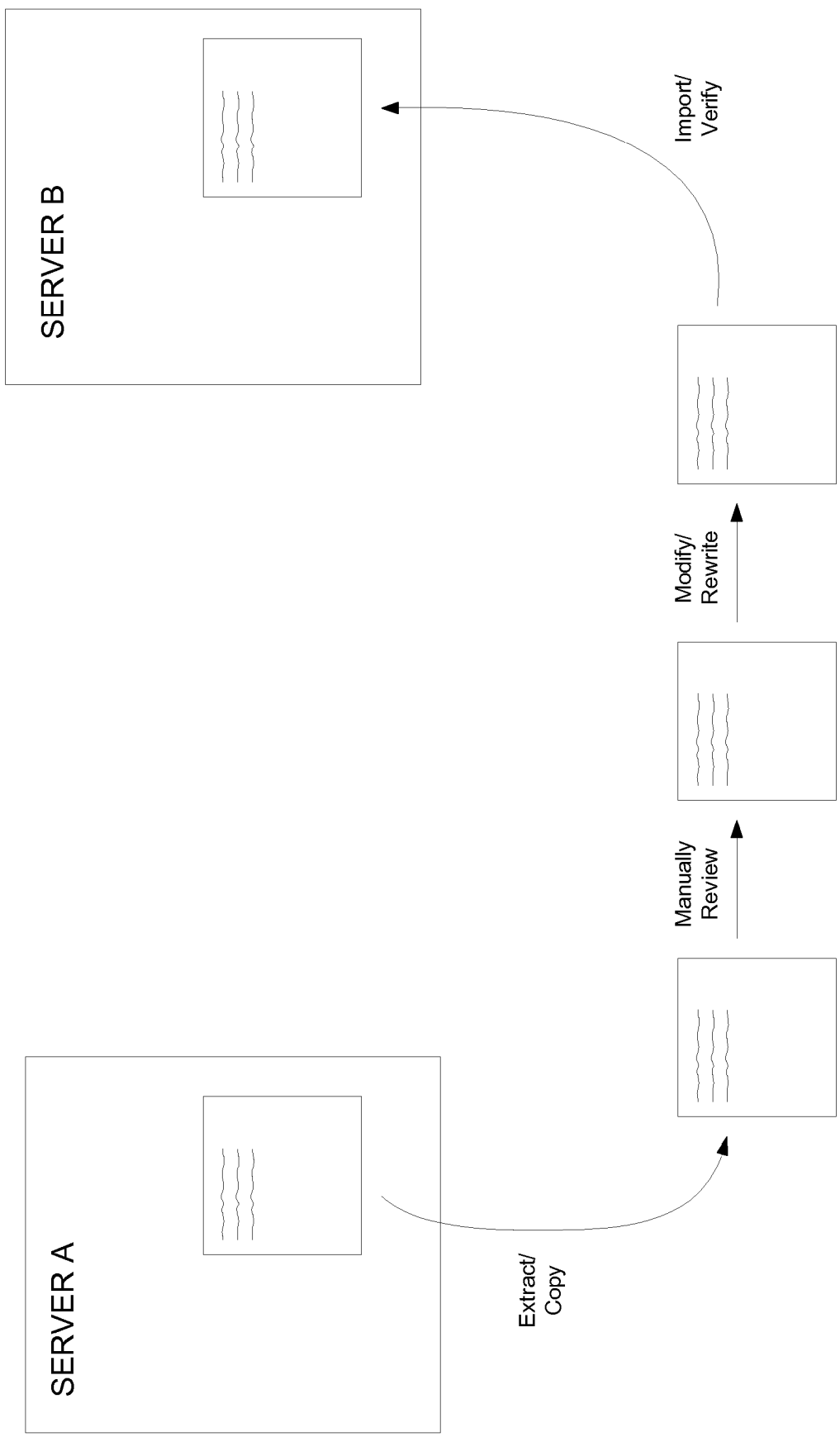
FIG. 1 shows an illustration of a manual application configuration mechanism for an application being moved or copied from a first server to a second server.

FIG. 1 shows an illustration of a manual application configuration mechanism for an application being moved or copied from a first server to a second server. As shown in FIG. 1, the traditional process is quite time-consuming, involving numerous steps. It requires the administrator, developer, or other person responsible for deploying applications, to first extract or copy the application deployment information from the first server. This configuration information must be reviewed by an experienced developer to determine any problems or dependencies that may need to be addressed prior to installing the application on the second server. References to data sources may need to be manually checked and edited to conform to the data sources on the destination machine. If the reviewer fails to locate all dependencies on data sources then the application may not work as intended. Once the information has been reviewed and edited, the configuration information is used to configure the second server. This step is often a cut-and-paste or data entry task, which is again time-consuming. and prone to error.

Figure 2:
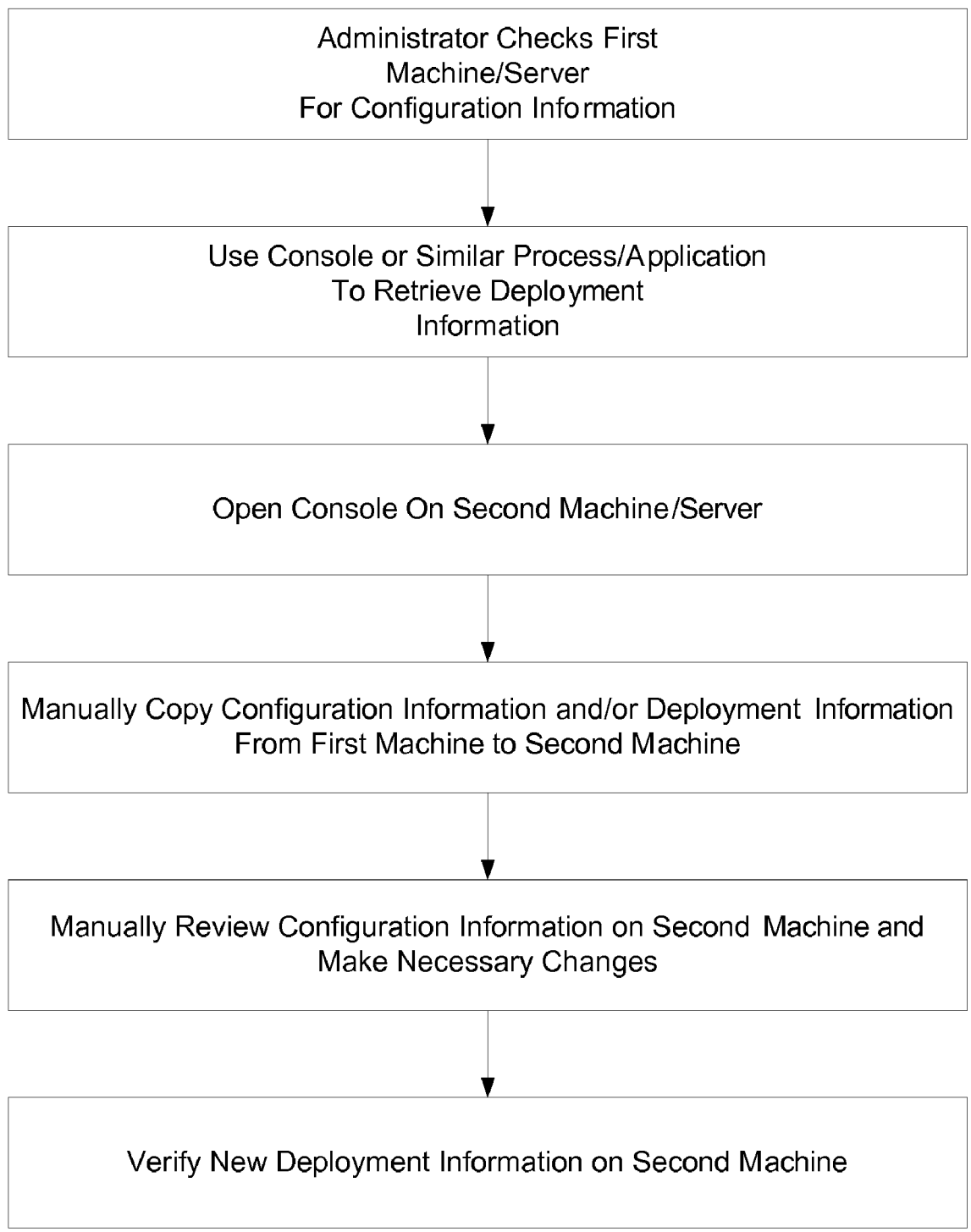
FIG. 2 shows a flowchart of a manual application configuration process.

FIG. 2 shows a flowchart of a manual application configuration process. As can be seen from FIG. 2, the administrator initially checks the first (source) server for the appropriate application configuration information. An administrative console application, or similar interface is then used to manually retrieve the deployment information for the desired application. The administrator typically then opens a console application or similar interface on the second (destination) server. Application deployment configuration information is manually copied from the first server to the second server. The administrator must then review the text entries, and use their expertise to check for any dependencies, which would need to be addressed by further investigation and copying. The configuration information must then be revised to match the environment on the second server.

Figure 3:
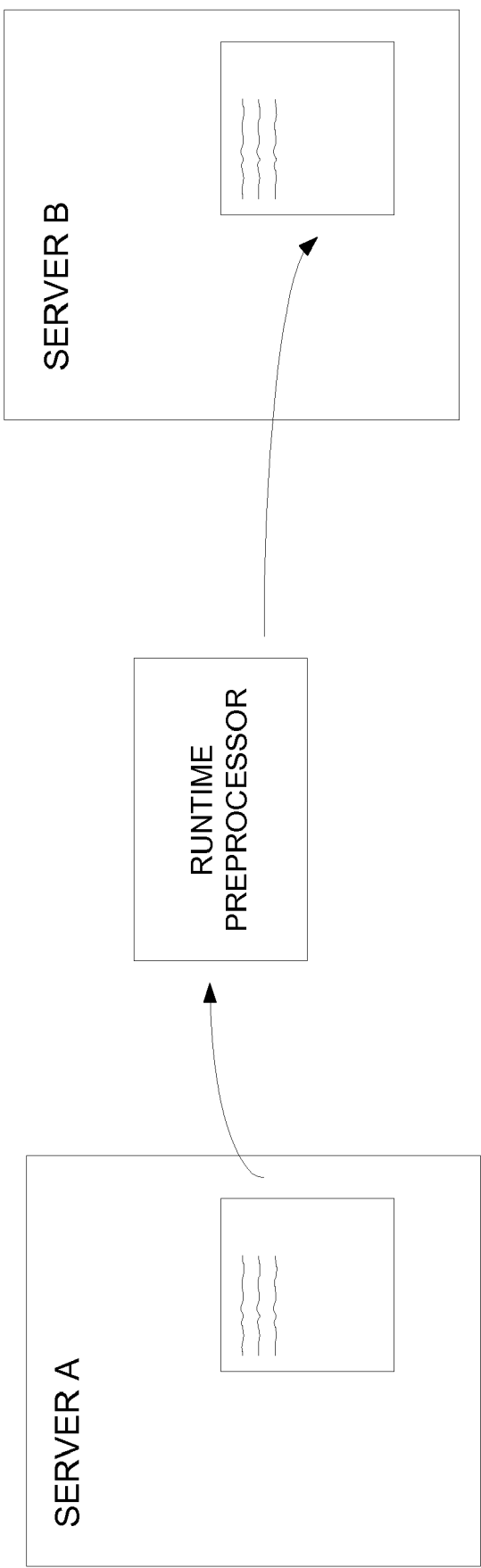
FIG. 3 shows an illustration of a system which uses a preprocessor to determine dependencies between J2EE components, in accordance with an embodiment of the invention.

FIG. 3 shows an illustration of a system which uses a preprocessor to determine dependencies between J2EE components, in accordance with an embodiment of the invention. As shown in FIG. 3, the deployment configuration is communicated from a first server to a second server by means of a preprocessor. Although shown in FIG. 3 as a separate logical entity, the preprocessor can be included with the first or second server, to better assist in moving applications to or from that server. Following deployment of the application on the first server, the preprocessor can be used to interrogate the deployment information and any dependencies included therein, and to communicate a subset of that information to the second server for use in deploying the application there. This communication may be automatic, or may include sending the information to an administrator for use by them in deploying the application.

FIG. 4 shows an illustration of the server-side, and application-side features used by the preprocessor, in accordance with an embodiment of the invention. As shown in FIG. 4, an application can be considered to have two sides—an application side and a server side. On the application side, a software developer must define the application (for example an EJB) to depend on one or more data sources (DS). During normal use the application is then deployed on an application server (in this instance any J2EE server, for example WebLogic). For that application, during deployment the server will make a connection from the data source to a JNDI name (for example com.bea.ds.oracle). This connection is then kept with the deployed EJB.

On the server side, the server must provide the management API's inside the server for use by the application. Data sources (DS) used by the server are defined with respect to connector pools, JMS queues, etc. The server must provide, or associate, each data source with a JNDI name with which that data source will be bound. The data source is then associated with a connection pool.

During the action of the preprocessor, the data source commonalities between the application side and the server side for the deployed application are interrogated and are used to provide application deployment configuration information, which can then be used to deploy the application on a second server, with appropriate dependencies. For example, the system can determine a particular data source. It will then determine that a particular EJB depends on that data source. It then determines that the data source depends by name on a particular connection pool, etc. This configuration information is output to a file, or communicated directly to the destination server.

Figure 5:
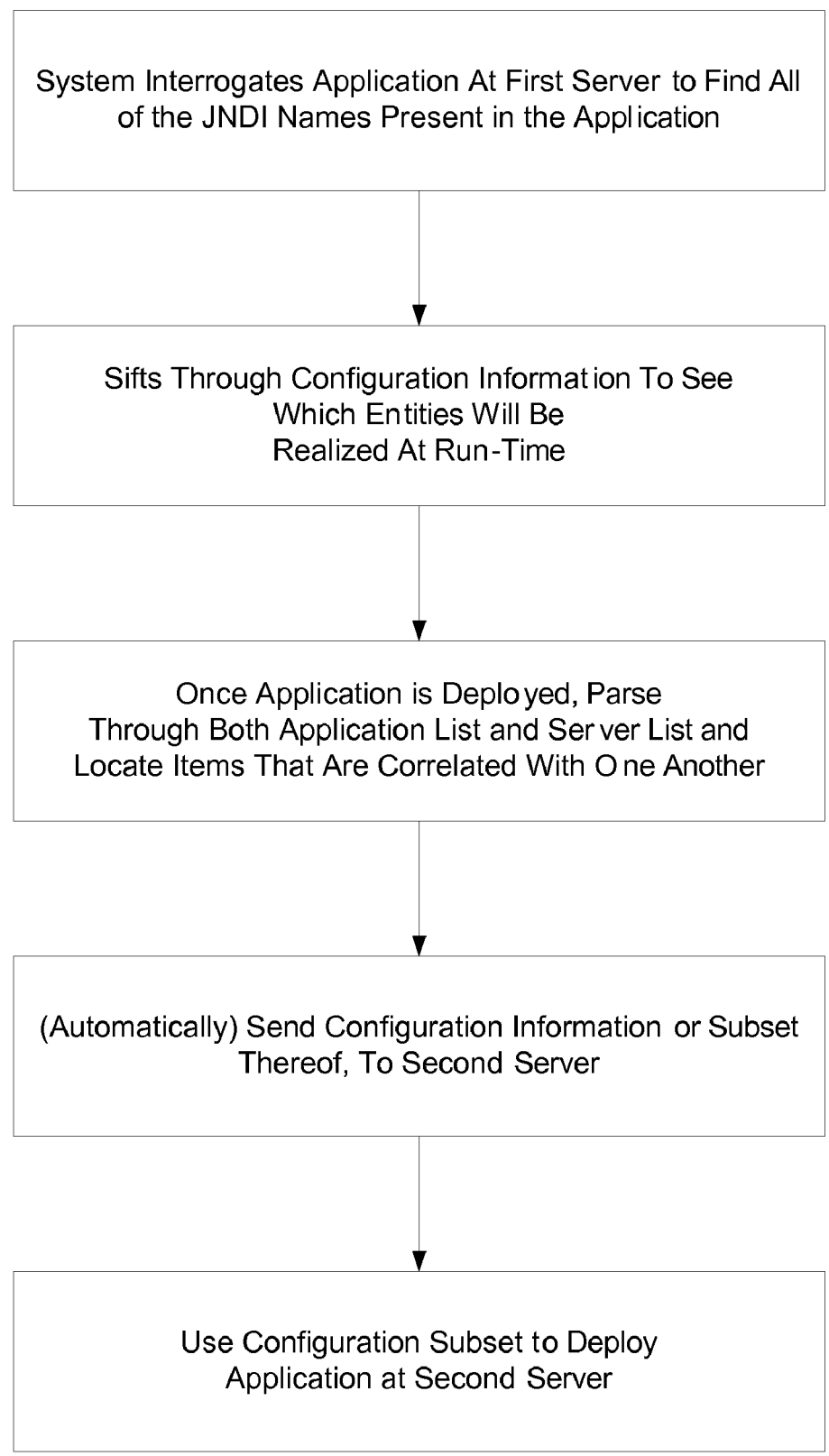
FIG. 5 shows a flowchart of a process which uses a preprocessor to determine dependencies between J2EE components, in accordance with an embodiment of the invention.

FIG. 5 shows a flowchart of a process which uses a preprocessor to determine dependencies between J2EE components, in accordance with an embodiment of the invention. As shown in FIG. 5, the system first interrogates the deployed application at a first server to find all JNDI names present in the application. This configuration information is sifted to see which entities will be realized at runtime. Once the application is deployed on the first server, the system can parse through both the application-side list, and the server-side list, and located those dependencies that correlate with one another. This configuration information is then either automatically sent to the second server, or is output to a file (in one embodiment a config.xml file) for use by the administrator in deploying the application on the second server. In other embodiments the information can be used to support a Web or graphical interface that allows an administrator to point-and-click to move applications from one server to another, to retrieve configuration information, and to deploy applications on a destination server. When the application is finally deployed on the second server, the administrator must typically make some minor adjustments to ensure that, e.g. the database names, and passwords, etc. specified by the application match those at the second server.

Code Implementation

The following code segments illustrate, by way of example, how the configuration information may be specified, and how the preprocessor may operate in accordance with one embodiment of the invention. It will be evident that additional implementations may be developed within the spirit and scope of the invention, and that the invention is not limited to the examples shown.

Configuration Information

```
<Config>
    <JDBCConnectionPool CapacityIncrement="1"
        DriverName="oracle.jdbc.driver.OracleDriver" InitialCapacity="1"
        LoginDelaySeconds="5" MaxCapacity="20" Name="ebayPool0"
        Properties="user=system;password=manager;dll=ocijdbc8;protocol=thin"
```

-continued

```
        RefreshMinutes="15" Targets="myserver" TestTableName="dual"
URL="jdbc:oracle:thin:@paradise:1521:para816"/>
    <JDBCTxDataSource EnableTwoPhaseCommit="false" JNDIName="ebay_ds0"
        Name="ebay_ds0" PoolName="ebayPool0" Targets="myserver"/>
</Config>
```

Generate Config JSP

```
<%@ page contentType="text/xml" %><%@
    page errorPage="/error.jsp" %><%@
    page import  =   "weblogic.management.*,
                    weblogic.apache.xml.serialize.*,
                    javax.management.*,
                    weblogic.management.internal.xml.*,
                    weblogic.management.configuration.*,
                    weblogic.management.descriptors.*,
                    weblogic.management.descriptors.toplevel.*,
                    weblogic.management.descriptors.weblogic.*,
                    weblogic.management.descriptors.webappext.*,
                weblogic.management.descriptors.webappext.ReferenceDescriptorMBean,
                weblogic.management.descriptors.webappext.ResourceDescriptionMBean,
                    javax.naming.*,
                    javax.xml.parsers.*,
                    org.w3c.dom.*"
%><%
        MBeanHome    home    =    (MBeanHome)    new
InitialContext( ).lookup(MBeanHome.ADMIN_JNDI_NAME);
                ApplicationMBean    app    =    (ApplicationMBean)    home.getMBean(new
WebLogicObjectName (request.getParameter("name")));
    ComponentMBean[ ] components = app.getComponents( );
    List jndiNames = new ArrayList( );
    for (int i = 0; i < components.length; i++) {
        if (components[i] instanceof WebAppComponentMBean) {
            WebAppComponentMBean webApp = (WebAppComponentMBean) components[i];
                            WebDescriptorMBean    webDescriptor    =    (WebDescriptorMBean)
webApp.findOrCreateWebDescriptor( );
            if (webDescriptor != null) {
                                            WebAppExtDescriptorMBean    webAppDescriptor    =
webDescriptor.getWebAppExtDescriptor( );
                if (webAppDescriptor != null) {
                                            ReferenceDescriptorMBean    refDescriptor    =
webAppDescriptor.getReferenceDescriptor( );
                    if (refDescriptor != null) {
                                            ResourceDescriptionMBean[ ]    resourceDescriptions    =
refDescriptor.getResourceReferences( );
                                for (int j = 0; resourceDescriptions != null && j    <
resourceDescriptions.length; j++) {
                            ResourceDescriptionMBean resourceDescription = resourceDescriptions[j];
                                jndiNames.add(resourceDescription.getJndiName( ));
                        }
                    }
                }
            }
        } else if (components[i] instanceof EJBComponentMBean) {
            EJBComponentMBean ejb = (EJBComponentMBean) components[i];
            EJBDescriptorMBean ejbDescriptor = ejb.findOrCreateEJBDescriptor( );
            if (ejbDescriptor != null) {
                WeblogicEJBJarMBean wlEJBJar = ejbDescriptor.getWeblogicEJBJarMBean( );
                if (wlEJBJar != null) {
                                            WeblogicEnterpriseBeanMBean[ ] wejbs    =
wlEJBJar.getWeblogicEnterpriseBeans( );
                        for (int j = 0; wejbs != null && j < wejbs.length; j++) {
                                weblogic.management.descriptors.weblogic.ReferenceDescriptorMBean
refDescriptor = wejbs[j].getReferenceDescriptor( );
                            if (refDescriptor != null) {
                                weblogic.management.descriptors.weblogic.ResourceDescriptionMBean[ ]
resourceDescriptions = refDescriptor.getResourceDescriptions( );
                                    for (int k = 0; resourceDescriptions != null && k    <
resourceDescriptions.length; k++) {
                                    weblogic.management.descriptors.weblogic.ResourceDescriptionMBean
resourceDescription = resourceDescriptions[k];
                                    jndiNames.add(resourceDescription.getJNDIName( ));
                            }
```

-continued

```
                    }
                }
            }
        }
    }
    DocumentBuilderFactory dbf = DocumentBuilderFactory.newInstance( );
    DocumentBuilder db = dbf.newDocumentBuilder( );
    Document appConfig = db.newDocument( );
    Element root = appConfig.createElement("ApplicationConfig");
    appConfig.appendChild(root);
    ConfigurationGenerator cg = new ConfigurationGenerator( );
            Document domainConfig = (Document) cg.getXml (home.getMBeanServer( ),
home.getActiveDomain( ).getName( ));
    Node top = domainConfig.getElementsByTagName("Domain").item(0);
    matchChildren(top, top, root, appConfig, jndiNames);
    OutputFormat format = new OutputFormat("XML", "UTF-8", true);
    XMLSerializer serializer = new XMLSerializer(out, format);
    serializer.serialize(appConfig);
%><%!
    private void matchChildren(Node domain, Node top, Node root, Document appConfig,
List jndiNames) {
        NodeList mbeansList = top.getChildNodes( );
        for (int i = 0; i < mbeansList.getLength( ); i++) {
            Node mbeanNode = mbeansList.item(i);
            NamedNodeMap attributes = mbeanNode.getAttributes( );
            if (attributes != null) {
                Node jndiNameNode = attributes.getNamedItem("JNDIName");
                if (jndiNameNode != null) {
                    String jndiName = jndiNameNode.getNodeValue( );
                    if (jndiNames.contains(jndiName)) {
                        if (mbeanNode.getParentNode( ) == domain) {
                            Node newNode = appConfig.importNode(mbeanNode, true);
                            newNode.getAttributes( ).removeNamedItem("Targets");
                            root.appendChild(newNode);
                        } else {
                            while(mbeanNode.getParentNode( ) != domain) {
                                mbeanNode = mbeanNode.getParentNode( );
                            }
                            Node newNode = appConfig.importNode(mbeanNode, true);
                            newNode.getAttributes( ).removeNamedItem("Targets");
                            root.appendChild(newNode);
                            return;
                        }
                    }
                }
            }
            matchChildren(domain, mbeanNode, root, appConfig, jndiNames);
        }
    }
%>
```

User Batched Test Bean

```
package com.sampullara.mdb;
import javax.ejb.*;
import javax.jms.*;
import javax.naming.InitialContext;
import javax.naming.NamingException;
import javax.transaction.*;
import weblogic.jms.extensions.*;
import weblogic.ejb20.internal.jms.*;
import java.lang.reflect.Method;
/**
 * @ejbgen:message-driven
 *   destination-jndi-name = jms.userbatchedqueue
 *   ejb-name = UserBatchedTest
 *   transaction-type = Bean
 *
 * @ejbgen:env-entry
 *   name = weblogic.ejb.mdb.batchsize
 *   type = java.lang.Integer
 *   value = 200
```

```
*
*/
public class UserBatchedTestBean extends TestBean implements MessageListener, Status
{
    private int txCount = 0;
    private UserTransaction tx;
    private int batchSize = 0;
    public void ejbCreate( ) throws CreateException {
        try {
            Object batchSizeObject = getEnvEntry("weblogic.ejb.mdb.batchsize");
            batchSize = ((Integer) batchSizeObject).intValue( );
            if (batchSize <= 0) {
                throw new CreateException("weblogic.jms.mdb.batchsize must be a positive
integer ( > 0 ), 1 is the default");
            }
        } catch (EJBException ejbe) {
            batchSize = 1;
        } catch (ClassCastException cce) {
                throw new CreateException("weblogic.jms.mdb.batchsize must have type
java.lang.Integer instead of " +
getEnvEntry("weblogic.jms.mdb.batchsize").getClass( ).getName( ));
        }
        try {
                                                                            tx      =      (UserTransaction)
getInitialContext( ).lookup("javax.transaction.UserTransaction");
        } catch (NamingException ne) {
                        throw new CreateException("Could not find the transaction manager
(javax.transaction.UserTransaction) in JNDI");
        }
        System.out.println("Batch size: " + batchSize);
    }
    public void onMessage(Message message) {
        try {
            switch (tx.getStatus( )) {
            case STATUS_ACTIVE:
                // Commit any messages that are already in process before trying the
redelivered message
                if (!commitIfRedelivered(message)) {
                    break;
                }
            case STATUS_NO_TRANSACTION:
            case STATUS_COMMITTED:
            case STATUS_ROLLEDBACK:
                // We understand the transaction state in these cases
                try {
                    tx.begin( );
                    System.out.println("New transaction");
                } catch (NotSupportedException nse) {
                    nse.printStackTrace( );
                    throw new BatchedMessageException("We are trying to nest transactions but
the code doesn't nest transactions", nse);
                }
                txCount = 0;
                break;
            default:
                // We don't understand the transaction state so we exit abruptly.
                System.out.println(tx.getStatus( ));
                throw new BatchedMessageException("Inconsistant transaction state, cannot
continue processing messages: " + tx.getStatus( ));
            }
        } catch (SystemException se) {
            se.printStackTrace( );
            throw new BatchedMessageException("Could not find the transaction in JNDI",
se);
        }
        txCount++;
        try {
            QueueSessionImpl sessionImpl = (QueueSessionImpl) getSession( );
            Method method = SessionImpl.class.getDeclaredMethod("getSession", new Class[ ]
{ });
            method.setAccessible(true);
            MDBTransaction session = (MDBTransaction) method.invoke(sessionImpl, new
Object[ ] { });
            session.associateTransaction (message);
        } catch (JMSException jmse) {
            jmse.printStackTrace( );
            throw new BatchedMessageException("Could not associate transaction with
message", jmse);
        } catch (ClassCastException cce) {
```

```
            cce.printStackTrace( );
                throw new BatchedMessageException("The container has the wrong kind of
sessions: " + getSession( ).getClass( ).getName( ), cce);
        } catch (Exception e) {
            e.printStackTrace( );
            throw new BatchedMessageException("Problem getting the session", e);
        }
        // We've started the transaction, now call the onMessage
        onMessageBatched(message);
        // If we have reached the batchsize, commit.
        if (!commitIfRedelivered(message)) {
            if (txCount == batchSize) {
                try {
                    System.out.println("commit");
                    tx.commit( );
                } catch (Exception e) {
                    e.printStackTrace( );
                    // Failure means we need these messages redelivered
                    throw new BatchedMessageException("Could not process message: " + message,
e);
                } finally {
                    txCount = 0;
                }
            }
        }
    }
    private boolean commitIfRedelivered(Message message) {
        // If this is a redelivered message then we commit immediately
        try {
            if (message.getJMSRedelivered( )) {
                try {
                    tx.commit( );
                    return true;
                } catch (Exception e) {
                    // Failure means we need these messages redelivered
                    e.printStackTrace( );
                    throw new BatchedMessageException("Could not commit messages", e);
                } finally {
                    txCount = 0;
                }
            }
        } catch (JMSException jmse) {
            throw new BatchedMessageException("JMS failed to retrieve redelivery flag",
jmse);
        }
        return false;
    }
    public void onMessageBatched(Message message) {
        super.onMessage(message);
    }
}
```

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application servers, servers, and computing environments, may use and benefit from the invention. The code example given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer system comprising at least one processor to migrate a software application from one application server to a different application server, comprising:
    a first application server that includes an application deployed thereon;
    a preprocessor server component on the first application server used to interrogate the functionality of the deployed application, the application's deployment information and any dependencies included therein, generate a new configuration information and communicate the new configuration information to a second application server that is used in deploying the application at the second application server;
    wherein said preprocessor performs the step of:
    interrogating the deployed application at the first application server to find all naming and directory interface entities present in the application;
    determining which of said naming and directory interface entities will be realized at runtime; and,
    parsing through both an application-side list, and a server-side list, and locating dependencies that correlate with one another; and
    wherein the application-side list defines enterprise beans used in the application and resources dependent thereon, and the server-side list defines management interfaces used by the application, data source, and messaging service queues.

2. The computer system of claim 1 wherein the deployment information is sifted to see which application entities will be realized at runtime.

3. A method for migrating a software application from one software application server to a different software application server, comprising the step of:
    providing a first application server that includes a preprocessor and an application deployed thereon;
    using the preprocessor to interrogate the functionality of the application, the application's deployment information and any dependencies included therein, generate new configuration information and communicate the new configuration information to a second application server that is used in deploying the application at the second application server;
    wherein said preprocessor performs the step of:
    interrogating the deployed application at the first application server to find all naming and directory interface entities present in the application;
    determining which of said naming and directory interface entities will be realized at runtime; and,
    parsing through both an application-side list, and a server-side list, and locating dependencies that correlate with one another; and
    wherein the application-side list defines enterprise beans used in the application and resources dependent thereon, and the server-side list defines management interfaces used by the application, data source, and messaging service queues.

4. The method of claim 3 wherein the deployment information is sifted to see which application entities will be realized at runtime.

5. A computer readable medium including instructions stored thereon which when executed cause the computer to perform the step of:
    providing a first application server that includes an application deployed and a preprocessor;
    interrogating the application's functionality, the application's deployment information and any dependencies included therein using the preprocessor, generating new configuration information, and communicating the new configuration information to a second application server that is used in deploying the application at the second application server;
    wherein said preprocessor performs the steps of:
    interrogating the deployed application at the first application server to find all naming and directory interface entities present in the application;
    determining which of said naming and directory interface entities will be realized at runtime; and,
    parsing through both an application-side list, and a server-side list, and locating dependencies that correlate with one another;
    communicating the new configuration information that is used in deploying the application on said second application server; and
    wherein the application-side list defines enterprise beans used in the application and resources dependent thereon, and the server-side list defines management interfaces used by the application, data source, and messaging service queues.

6. A computer system for readily deploying software applications from a first server to a second server, comprising:
    a first server having an application deployed thereon;
    a second server adapted to receive said application;
    a preprocessor on said first server that interrogates the application's functionality, the application's deployment information as deployed on said first server, and any dependencies included therein, and generates and communicates a new configuration information, that is used in deploying the application at said second server;
    wherein said preprocessor performs the steps of:
    interrogating the deployed application at the first application server to find all naming and directory interface entities present in the application;
    determining which of said naming and directory interface entities will be realized at runtime; and,
    parsing through both an application-side list, and a server-side list, and locating dependencies that correlate with one another;
    wherein the application-side list defines enterprise beans used in the application and resources dependent thereon, and the server-side list defines management interfaces used by the application, data source, and messaging service queues.

7. A method for readily deploying software applications from a first server to a second server, comprising the steps of:
    providing a first server having an application deployed thereon and a preprocessor;
    providing a second server adapted to receive said application;
    interrogating the application's functionality, the application's deployment information as deployed on said first server, and any dependencies included therein using the preprocessor, and generating and communicating a new configuration information, that is used in deploying the application at said second server;
    wherein said preprocessor performs the steps of:
    interrogating the deployed application at the first application server to find all naming and directory interface entities present in the application;
    determining which of said naming and directory interface entities will be realized at runtime; and, parsing through both an application-side list, and a server-side list, and locating dependencies that correlate with one another;

communicating the new configuration information that is used in deploying the application on said second application server; and wherein the application-side list defines enterprise beans used in the application and resources dependent thereon, and the server-side list defines management interfaces used by the application, data source, and messaging service queues.

8. A computer readable medium including instructions stored thereon which when executed cause the computer to perform the steps of:

providing a first server having an application deployed thereon and a preprocessor;

providing a second server adapted to receive said application;

interrogating the application's functionality, the application's deployment information as deployed on said first server, and any dependencies included therein using the preprocessor, and generating and communicating a new configuration information, that is used in deploying the application at said second server;

wherein said preprocessor performs the steps of:

interrogating the deployed application at the first application server to find all naming and directory interface entities present in the application;

determining which of said naming and directory interface entities will be realized at runtime; and, parsing through both an application-side list, and a server-side list, and locating dependencies that correlate with one another;

communicating the new configuration information that is used in deploying the application on said second application server; and wherein the application-side list defines enterprise beans used in the application and resources dependent thereon, and the server-side list defines management interfaces used by the application, data source, and messaging service queues.

\* \* \* \* \*

UNITED STATES PATENT AND TRADEMARK OFFICE
CERTIFICATE OF CORRECTION

PATENT NO. : 7,328,427 B2  Page 1 of 1
APPLICATION NO. : 10/789012
DATED : February 5, 2008
INVENTOR(S) : Pullara It is certified that error appears in the above-identified patent and that said Letters Patent is hereby corrected as shown below:

In column 2, line 46, delete "run time" and insert -- runtime --, therefor.

In column 3, line 17, delete "time-consuming." and insert -- time-consuming --, therefor.

In column 13, line 65, in claim 5, after "deployed" insert -- thereon --.

In column 14, line 43, in claim 6, after "another;" insert -- and --.

Signed and Sealed this

Twenty-third Day of March, 2010

David J. Kappos
*Director of the United States Patent and Trademark Office*